United States Patent
de Paula Rosa Piga et al.

(10) Patent No.: US 9,990,203 B2
(45) Date of Patent: Jun. 5, 2018

(54) HARDWARE ACCURACY COUNTERS FOR APPLICATION PRECISION AND QUALITY FEEDBACK

(71) Applicant: Advanced Micro Devices, Inc., Sunnyvale, CA (US)

(72) Inventors: Leonardo de Paula Rosa Piga, Austin, TX (US); Abhinandan Majumdar, Ithaca, NY (US); Indrani Paul, Austin, TX (US); Wei Huang, Austin, TX (US); Manish Arora, Sunnyvale, CA (US); Joseph L. Greathouse, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 219 days.

(21) Appl. No.: 14/981,310

(22) Filed: Dec. 28, 2015

(65) Prior Publication Data

US 2017/0185409 A1 Jun. 29, 2017

(51) Int. Cl.
*G06F 9/30* (2018.01)

(52) U.S. Cl.
CPC ...... *G06F 9/30192* (2013.01); *G06F 9/30083* (2013.01); *G06F 9/30145* (2013.01)

(58) Field of Classification Search
None
See application file for complete search history.

(56) References Cited

U.S. PATENT DOCUMENTS

| | | | | |
|---|---|---|---|---|
| 7,448,026 B1 * | 11/2008 | Gustafson | ........... | G06F 11/3624 708/495 |
| 9,658,851 B2 * | 5/2017 | Keramidas | .......... | G06F 9/30058 |
| 2010/0125836 A1 * | 5/2010 | Sazegari | ............... | G06F 8/4443 717/151 |
| 2015/0089192 A1 * | 3/2015 | Gonion | ................... | G06F 15/78 712/7 |
| 2015/0227407 A1 * | 8/2015 | Henry | ................... | G06F 1/3215 714/47.1 |

(Continued)

OTHER PUBLICATIONS

Hoffman, Henry, et al., "Dynamic knobs for responsive power-aware computing", In Proceedings of the sixteenth international conference on Architectural support for programming languages and operating systems (ASPLOS XVI), Mar. 5-11, 2011, pp. 199-212, ACM, New York, NY, USA.

(Continued)

*Primary Examiner* — Eric Coleman
(74) *Attorney, Agent, or Firm* — Volpe and Koenig, P.C.

(57) ABSTRACT

Methods, devices, and systems for capturing an accuracy of an instruction executing on a processor. An instruction may be executed on the processor, and the accuracy of the instruction may be captured using a hardware counter circuit. The accuracy of the instruction may be captured by analyzing bits of at least one value of the instruction to determine a minimum or maximum precision datatype for representing the field, and determining whether to adjust a value of the hardware counter circuit accordingly. The representation may be output to a debugger or logfile for use by a developer, or may be output to a runtime or virtual machine to automatically adjust instruction precision or gating of portions of the processor datapath.

20 Claims, 6 Drawing Sheets

(56) References Cited

U.S. PATENT DOCUMENTS

2015/0234783 A1* 8/2015 Angerer .................. G06F 17/16
708/520

OTHER PUBLICATIONS

Venkataramani, Swagath, et al., "Quality programmable vector processors for approximate computing", In Proceedings of the 46th Annual IEEE/ACM International Symposium on Microarchitecture (MICRO-46), Dec. 7-11, 2013, pp. 1-12, ACM, New York, NY, USA.

* cited by examiner

US 9,990,203 B2

HARDWARE ACCURACY COUNTERS FOR APPLICATION PRECISION AND QUALITY FEEDBACK

STATEMENT REGARDING FEDERALLY SPONSORED RESEARCH OR DEVELOPMENT

This invention was made with Government support under Prime Contract Number DE-AC52-07NA27344, Subcontract No. B609201 awarded by the United States Department of Energy. The Government has certain rights in this invention.

TECHNICAL FIELD

The disclosed embodiments are generally directed to processing devices, and in particular, to analysis of the accuracy of instructions executing on a processor.

BACKGROUND

Modern computers may be limited by the amount of power used in their processors. With the decline of Dennard scaling, each new generation of silicon technology allows for more transistors to fit into the same die area, but does not allow for a reduction in power consumption at the same rate. This may result in increased power and thermal density. Power is thus a design constraint in modern processors. System level power and energy efficiency may also be differentiating factors in the marketplace for computing devices.

SUMMARY OF EMBODIMENTS

Some embodiments provide a method for capturing the accuracy of an instruction executing on a processor. A representation of the accuracy of the instruction may be captured using a hardware counter circuit of the processor. A datatype of the instruction may be adjusted based on the representation.

Some embodiments provide a processor configured for capturing the accuracy of an instruction executing on the processor. The processor may include a processing circuit configured to execute the instruction. The processor may include a hardware counter circuit configured to capture a representation of the accuracy of the instruction. The processor may include an adjustment circuit configured to adjust a datatype of the instruction based on the representation.

Some embodiments provide a non-transitory computer readable medium including instructions stored thereon which when executed by a processing device cause the processing device to execute an instruction, capture a representation of the accuracy of the instruction using a hardware counter circuit, and adjust a datatype of the instruction based on the representation.

BRIEF DESCRIPTION OF THE DRAWINGS

A more detailed understanding may be had from the following description, given by way of example in conjunction with the accompanying drawings wherein.

DETAILED DESCRIPTION

Figure 1:
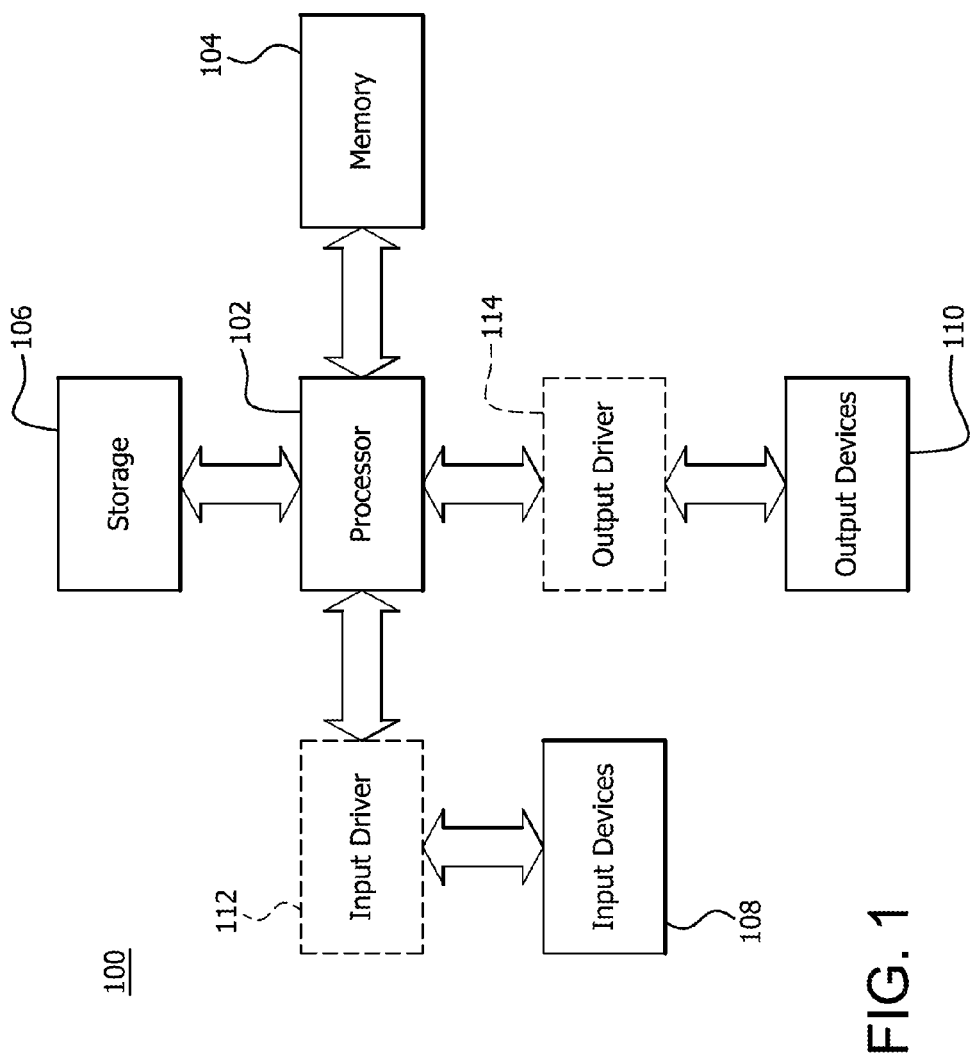
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU, a GPU, or other related device such as an application-specific integrated circuit (ASIC), digital signal processor (DSP), or a media processor. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

One way of saving power and energy in a processor or computing system may be to reduce the amount of computation that is needed to be done to perform a particular task. This may be done by substituting one algorithm for another (e.g., using a quicksort rather than a bubble sort algorithm). Another way of reducing the amount of computation may be to perform an approximate calculation rather than a more accurate calculation. For example, when encoding a movie, a simpler and/or lossier compression algorithm may be used rather than a more complex lossless compression algorithm.

Lossy compression is a relatively simple example of an algorithm with which an approximate (or more approximate) calculation may be substituted for a more accurate calculation. However other types of calculations are not as straightforward to "run approximately". Accordingly, it may be desired to provide feedback, such as to a software developer or to a runtime system for example, which indicates an amount of precision being used by, or required by, a certain portion of code.

Such feedback may be useful to allow developers to select algorithms requiring a lesser degree of precision (and potentially less power to execute) than may otherwise have been chosen for a given application. Such feedback may also be useful to allow a runtime system to dynamically or automatically determine whether, when, and/or to what degree to reduce the precision of a hardware device (and potentially, its power consumption) without unacceptably degrading the desired output of the application.

One possible approach to providing such feedback may be to implement one or more accuracy counters in hardware. Such counters may capture instruction accuracy during an application runtime. Accuracy may be represented in terms of precision, or datatype necessary to preserve accuracy while minimizing runtime resource usage. For example, a performance counter may be created to count the number of instructions that meet a particular set of criteria.

Some example implementations of accuracy counters may include performance monitoring counters (PMCs, which may increment to count the total number of operations which meet particular accuracy criteria), common event identification registers (which may hold a flag that indicates particular accuracy criteria have been met), instruction-based sampling mechanisms (such that a percentage of instructions are analyzed and a great deal of information, including accuracy information, is reported about the analyzed instructions), or event trace mechanisms (which can gather information for operations which meet certain accuracy criteria and save the information into memory or push them to debug ports). These various performance monitoring mechanisms may be configured to indicate whether an instruction includes a floating point or integer operation, the precision of the operation, and/or other various accuracy information about the instructions running on the processor. Another example implementation may include per-instruction datatype counters. Such counters may record, for example, the amount of time that a particular datatype has been sufficient for processing a particular instruction. Accuracy counter implementations may thus be instruction or data dependent.

Captured accuracy counter information may be used to recommend one or more appropriate application programming interfaces (APIs) or code adjustments to an application developer during the course of development and testing. For example, a linear algebra library may have different API functions for computing equations on double precision numbers versus single precision numbers. If the calculations a programmer are performing do not need higher precision (as indicated by the accuracy counters), the programmer may change the APIs that are called within the program in order to increase performance (since single precision calculations often run faster) and reduce power (since single precision calculations often use fewer hardware resources). Similarly, if the accuracy counters indicate that, even at the highest hardware-supported precision, more precision would be helpful, the programmer may make code adjustments such as adding algorithmic support for higher precision (e.g., arbitrary precision libraries, compensated arithmetic, etc.). This accuracy information may be gathered during preliminary or training runs of the application (e.g., during compile time), may be gathered as the application runs and sent to runtime systems, or may be gathered on test machines or user machines and returned to the developer using known reporting mechanisms in order to make changes to future versions of the application.

Accuracy counters may also be used to invoke a dynamic or automatic reconfiguration of hardware (e.g., using clock or power gating of a calculation unit such as an arithmetic logic unit (ALU), a portion thereof, or a portion of the width of a bus) or software (e.g., by substituting a lower precision version of an instruction) using, for example, a runtime system, interpreter, virtual machine, operating system, compiler, code analyzer, or portable code machine. Such reconfiguration may allow the code and/or processor to meet the accuracy requirements reflected by the captured accuracy counter information and/or specified by the developer while running with less operational power than would otherwise be consumed. Such hardware reconfiguration decisions may be performed in conjunction with other information. For example, a processor which is heavily power constrained or which is running at a high temperature may switch to using lesser-accuracy instructions, while a cooler processor may use higher-accuracy instructions; these decisions may be made based on the magnitude of accuracy indicated in the accuracy counters.

Table 1 below lists pseudocode for a simplified example of an API recommendation based on captured accuracy counter information. In this example, appropriate hardware and/or software recommends a change in datatype from int to short int for variable i based on the usage of i. Such a recommendation may be made, for example, prior to compiling the code, or dynamically during runtime with respect to object code or intermediate code. In this example, i is limited to values falling within the range of a short int. Table 2 below lists pseudocode for a simplified example of a code adjustment based on captured accuracy counter information. In this example, appropriate hardware and/or software alters the code (e.g., prior to runtime or dynamically during runtime) to change the datatype of i to a short int during the range of operation where the value of i falls within the range of a short int datatype, and to int during the range of operation where the value of i falls within the range of an int datatype.

TABLE 1 for (int i = 0; i < 1000; i++) {
  A[i] = ...
}
Recommendation = Change datatype of i to short int

TABLE 2

Original Code =
for (int i = 0; i < 50000; i++) {
  A[i] = ...
}
Code Adjustment =
for (short int i = 0; i < 32768; i++) {

TABLE 2-continued

```
    A[i] = ...
}
for (int i = 32768; i < 50000; i++) {
    A[i] = ...
}
```

Thus, such feedback mechanisms may be used as a static reference to guide programmers with a set of appropriate APIs and/or to dynamically or automatically reconfigure hardware, rather than simply providing a feedback mechanism based on load and/or power fluctuations. Such feedback mechanisms may also provide a way to guide programmers and/or dynamic or automatic adjustments without the need for the programmer to identify and/or explicitly tag instructions with an expected quality and/or accuracy.

Figure 2:
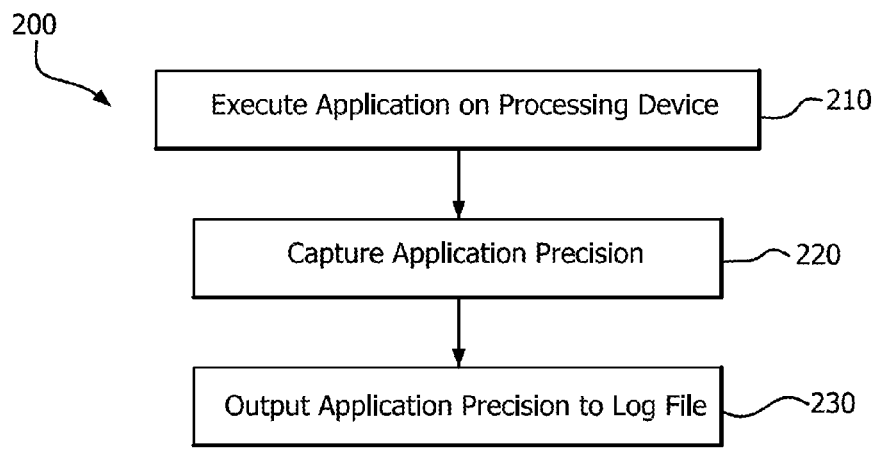
FIG. 2 is a flow chart illustrating an example method for providing static application quality feedback.

FIG. 2 is a flow chart illustrating an example method 200 for providing static application quality feedback. Method 200 may be implemented, for example, using device 100 as described regarding FIG. 1, or any other suitable computing device.

In step 210, an application may be executed on a processing device. The processing device may be any suitable processing device, such as processor 102.

In step 220, a precision measurement of the application is captured. Various approaches to capturing such precision measurements are discussed further herein. For example, precision measurements may be captured using a hardware counter of the processing device. Such hardware counter may be constructed to record a number of instructions of the application having a certain precision that have been executed. In one example implementation, a performance counter may include a unit mask set to count quad word or half precision instructions during the execution of the application. In some implementations, a counter may be configured with a unit mask which allows it to count at different rates depending on the difference between requested precision and required precision (e.g., half-precision values in double-precision instructions count faster than single-precision values in the same instruction).

In another example, the performance counters may implement event-based sampling, e.g., sampling the instruction precision every $1000^{th}$ event, (or some other preset number of events, such as $1^{st}$, $100^{th}$, $500^{th}$, etc.) where an event may be a particular instruction, any instruction, or an interrupt, for example. This may be used to identify accuracy requirements for specific sections of an application. For example, where a counter set to record half-precision floating point events operates frequently within a particular function, this observation may be used by a developer or runtime system to reduce the required precision to half-precision in order to save energy.

In a simple example of measurement capture at a given time, the processor may have executed ten ADD instructions using operands and/or producing a result at the single-word precision, one ADD instruction using operands and/or producing a result at the double-word precision, and one ADD instruction using operands and/or producing a result at the quad-word precision. In this example, if a separate counter is instantiated for single-, double-, and quad-word precision instructions, these counters will have a value of 10, 1, and 1, respectively at the given time (assuming no other instructions of each precision have been executed since the counters were reset to zero).

In step 230, the values of the hardware counters are output to a log file, debugger, or any other suitable output format. This may be done, for example, to provide statistical data about precision to a software developer. Using the example above, if the log file reflects that running the application on the processor resulted in ten instructions executed at single precision, but only one instruction each at double and quad precision respectively, this information may allow the programmer to make decisions based on the statistical distribution. For example, if a certain amount of imprecision (i.e., incorrect results of ADD instructions in this example) is acceptable, the programmer may opt to code the application using only single precision variables (rather than using only quad precision variables to accommodate all cases), or use an API yielding only single precision ADD instructions, since the majority of instructions are of single precision. In one example, the feedback may be provided to a developer via a debugger, or a wider software development suite, such as AMD CodeXL™. As another example, this information may be gathered on users' systems and returned to the developer over the Internet or through other data transfer mechanisms.

Figure 3:
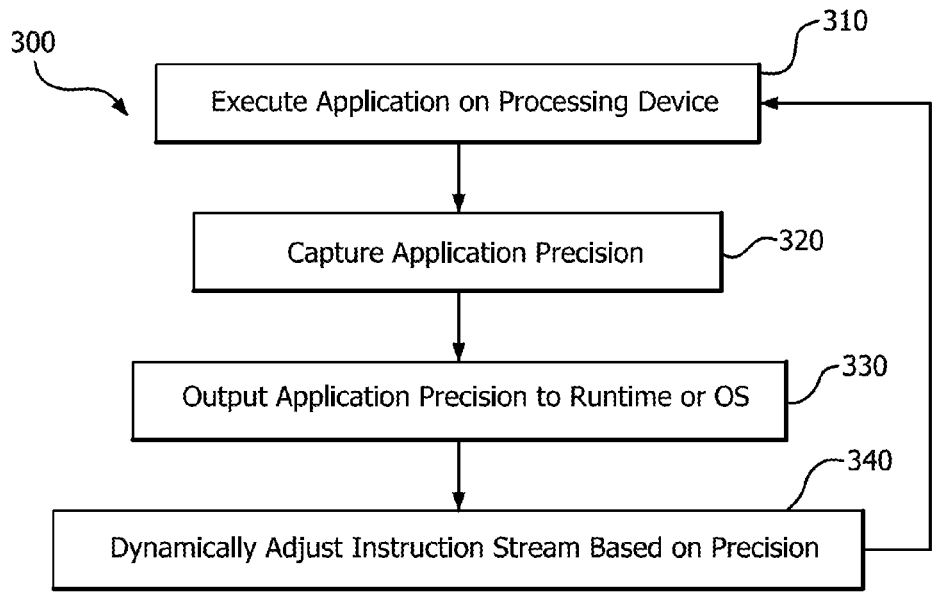
FIG. 3 is a flow chart illustrating an example method for providing dynamic or automatic application quality feedback.

FIG. 3 is a flow chart illustrating an example method 300 for providing dynamic or automatic application quality feedback. Method 300 may be implemented, for example, using device 100 as described regarding FIG. 1, or any other suitable computing device.

In step 310, an application may be executed on a processing device. The processing device may be any suitable processing device, such as processor 102.

In step 320, a precision measurement of the application is captured. As in method 200, various approaches to capturing such precision measurements are discussed further herein, such as described above regarding step 220 of FIG. 2. For example, precision measurements may be captured using a hardware counter of the processing device. Such a hardware counter may be constructed to record a number of instructions of the application having a certain precision that have been executed. In one example implementation, a performance counter may include a unit mask set to count quad word or half precision instructions during the execution of the application. In some implementations, a counter may be configured with a unit mask such that allows it to count at different rates depending on the difference between requested precision and required precision (e.g., half-precision values in double-precision instructions count faster than single-precision values in the same instruction).

In another example, the performance counters may implement event-based sampling, e.g., sampling the instruction precision every $1000^{th}$ event, (or some other preset number of events, such as $1^{st}$, $100^{th}$, $500^{th}$, etc.) where an event may be a particular instruction, any instruction, or an interrupt, for example. This may be used to identify accuracy requirements for specific sections of an application. For example, where a counter set to record half-precision floating point events operates frequently within a particular function, this observation may be used by a developer or runtime system to reduce the required precision to half-precision in order to save energy.

In a simple example of an accuracy counter measuring information at a given time, the processor may have executed ten ADD instructions using operands and/or producing a result at the single-word precision, one ADD instruction using operands and/or producing a result at the double-word precision, and one ADD instruction using operands and/or producing a result at the quad-word precision. In this example, if a separate counter is instantiated for single-, double-, and quad-word precision instructions, these counters will have a value of 10, 1, and 1, respectively at the given time (assuming no other instructions of each precision have been executed since the counters were reset to zero).

In step 330, the values of the hardware counters are output to an application runtime, operating system, or any other suitable output consumer, such as a Java™ virtual machine. This may be done, for example, to provide dynamic statistical data about precision to the consumer.

In step 340, the output from the hardware counters is used by the consumer to dynamically or automatically adjust the execution of the application, for example, by adjusting the precision of the instruction stream. Using the example above, if the output from the hardware counters reflects that running the application on the processor has so far resulted in ten instructions executed at single precision, but only one instruction each at double and quad precision respectively, this information may allow the consumer to make decisions based on the statistical distribution. For example, if a certain amount of imprecision (i.e., incorrect results of ADD instructions in this example) is acceptable (e.g., in a lossy compression scenario), the consumer may opt to execute the application using only single precision variables (rather than using only quad precision variables to accommodate all cases), or using an API yielding only single precision ADD instructions, since the majority of instructions are of single precision. This may be done, for example, in order to conserve power or other processor resources. In one example, the feedback may be provided to the Java™ virtual machine, which may substitute instructions having a desired precision during the runtime of the application.

The flow of method 300 returns to step 310 to indicate continuing dynamic or automatic capture of precision information and adjustment of the application execution based on the captured precision information.

Figure 4:
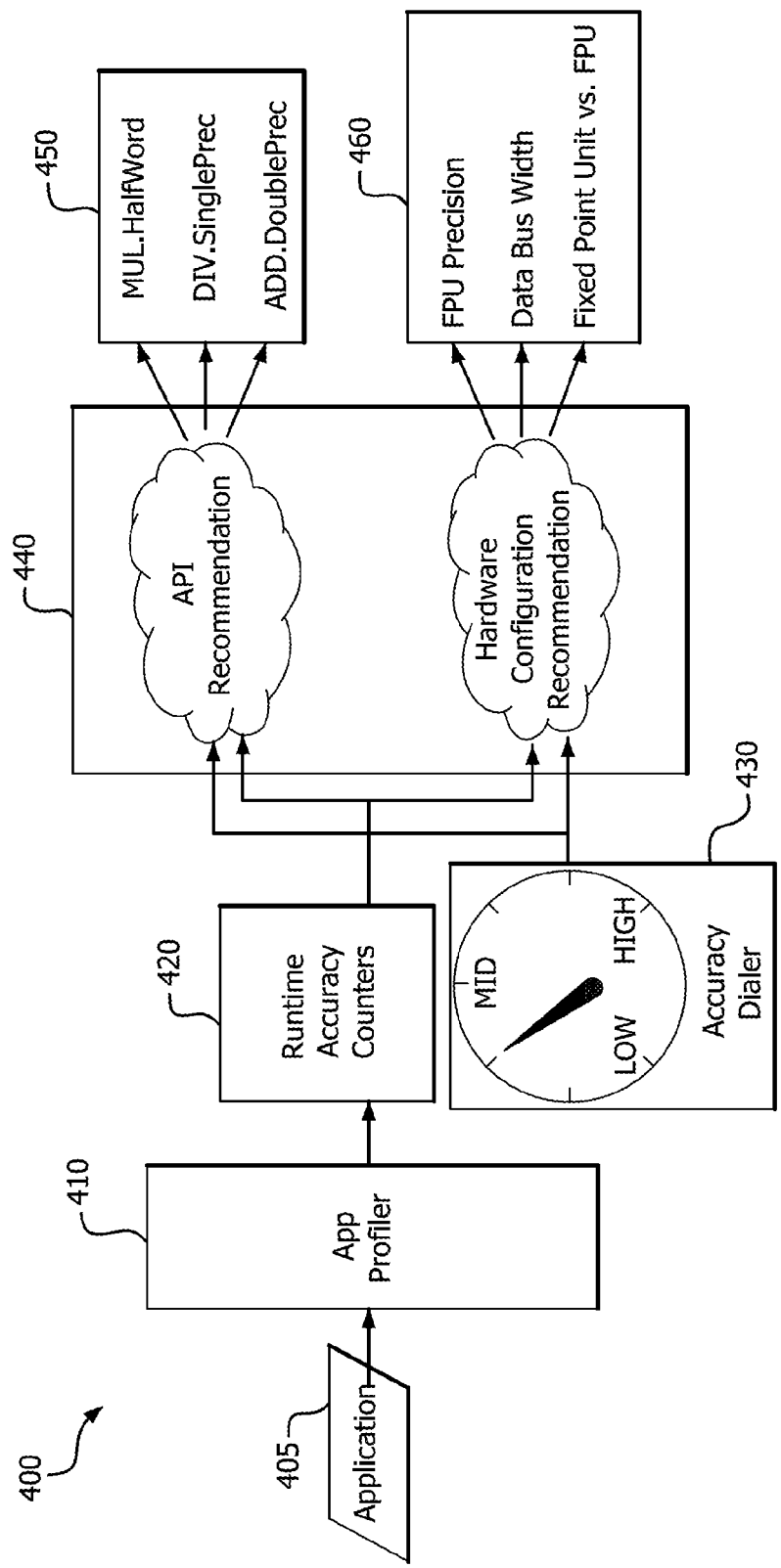
FIG. 4 is a system diagram showing a system which illustrates an example high-level use case for hardware accuracy counters.

FIG. 4 is a system diagram showing a system 400, which illustrates an example implementation of hardware accuracy counters. System 400 includes an application profiler 410, accuracy counters 420, accuracy dialer 430, and performance adjuster 440. System 400 may be implemented, for example, using a part of processor 102, or any other suitable processor.

Application profiler 410 may include a hardware unit of a processor which takes an application instruction stream 405 (and/or values of the instructions in the instruction stream 405, or other values) as input and increments or otherwise outputs values to the accuracy counters 420. Values of instructions may include, for example, data inputs or outputs of instructions, such as immediate values of operands of the instructions, or values stored in registers referenced by operands of the instructions. Application profiler 410 may also or alternatively include a simulator executing on a processor, such as, for example, a Verilog™ or VHDL hardware simulator. Various example implementations of application profiler 410 are discussed further herein. Application profiler 410 may, for example, include circuitry configured to parse or otherwise analyze the instruction stream 405 to determine a bit width and/or values of specific bits of instructions, their operands, results, and/or other fields.

Accuracy counters 420 include one or more hardware counters of the processor which receive the information from application profiler 410 regarding the bit width and/or values of specific bits of instructions, their operands, and/or results. Based on this information, the one or more accuracy counters 420 accumulate or otherwise record a count or other statistical measurement of the accuracy and/or precision of the instruction stream 405. Various example implementations of accuracy counters 420 are discussed further herein.

Accuracy dialer 430 is an interface (e.g., a feature of a debugger, administrative panel of a runtime system, configuration mechanism for an application, etc.) whereby a programmer or other user of system 400 can specify an accuracy requirement of the application. For example, if the instruction stream 405 relates to a media application, a user may specify an accuracy requirement for the media application in terms of bit rate or frames per second. If the instruction stream 405 relates to data analytics or learning applications, the accuracy requirement may be stated in terms of error rate or number of maximum iterations for convergence, for example. Various other types of accuracy requirements are possible.

Performance adjuster 440 may be a hardware unit of the primary processor (e.g., processor 102 or a helper processor of system 400. It is noted however that performance adjuster 440 may also or alternatively be implemented in firmware or software run either on the primary processor or helper processors of system 400. Performance adjuster 440 may take the data stored in accuracy counters 420 (or other data based on this data) and the output of the accuracy dialer 430 as inputs, and may output an API recommendation 450 and/or a hardware configuration recommendation 460. API recommendation output 450 may include, for example, an indication (e.g., a log entry) that all MUL instructions should execute at a half-word precision, that all DIV instructions should execute at single precision, and that all ADD instructions should execute at double precision. Hardware configuration recommendation output 460 may include, for example, an indication (e.g., a log entry) of a recommended floating point unit precision setting, a recommended data bus width, and/or whether to use a fixed point unit or a floating point unit of the processor for a particular calculation. Such recommendations may be based both on the accuracy counters 420 and the accuracy dialer 430. For example, the accuracy counters 420 may reflect that an overwhelming statistical fraction of ADD instructions may be executed at the half-word precision (e.g., where a half-word precision counter reflects a large number of ADD instructions having been executed using a bit width within a half-word range, and where a full-word precision counter reflects a small number of ADD instructions having been executed using a bit width within a full-word range). However, if the accuracy dialer 430 reflects that by using only half-word precision, the loss of precision would be too great (e.g., by providing a setting input by a developer), the recommendation 450 may reflect this in recommending a double-precision ADD instruction, for example, in order to avoid a loss of accuracy that would be inconsistent with the setting of the accuracy dialer.

In an example operation of system 400, an application may be profiled through application profiler 410 with accuracy dialer 430 configured to its maximum precision setting. For example, the processor may have all registers set to the maximum width datatype (i.e., the datatype supporting the greatest number of bits, which in this example is a 64 bit quad-word) and may have all hardware units ungated (i.e., powered, and available for calculations). This may establish a runtime accuracy metric for the current phase of the application. A user may then reduce the setting of accuracy dialer 430 to the required accuracy level for the current phase of the application. Performance adjuster 440 may then output API recommendations 450 and/or hardware configuration recommendations 460 accordingly. If the user, developer, or runtime system knows that the phase of the application changes (e.g., that the application may enter another phase of operation which may have different accuracy requirements), the accuracy dialer 430 may be changed and the process repeated.

It is noted that in other applications, the accuracy dialer 430 may be controlled dynamically by an operating system or other feedback mechanism.

Figure 5:
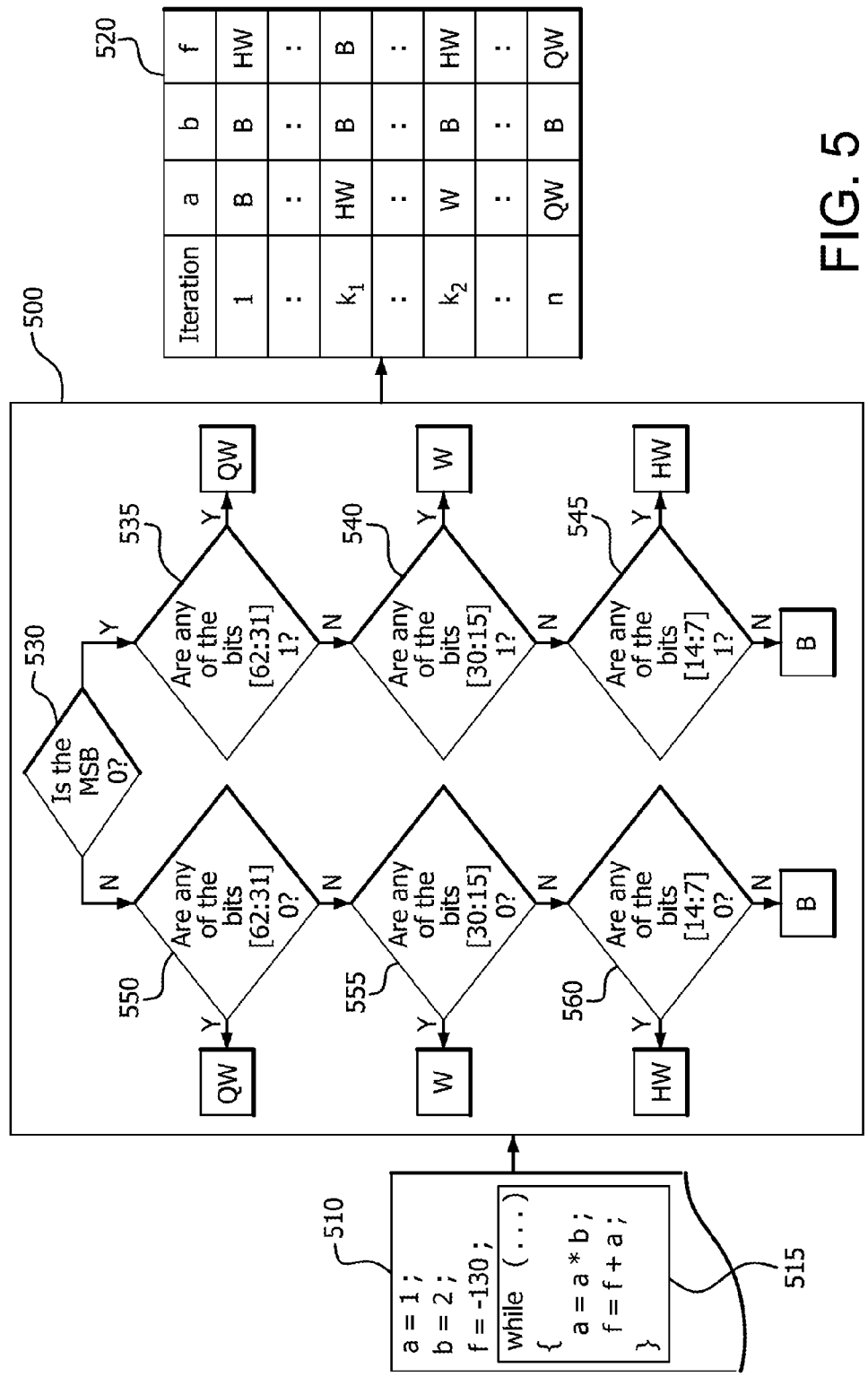
FIG. 5 is a flow chart which illustrates the operation of an example integer datatype classifier for classifying integer data into various datatypes.

FIG. 5 is a flow chart which illustrates the operation of an example integer datatype classifier 500 for classifying integer data into various datatypes. In general, an integer datatype classifier may analyze an integer value, a subset of bits representing the value, or several subsets of bits representing the value, to determine whether the value falls within a given range which requires a datatype having a particular minimum precision. Integer datatype classifier 500 may be implemented, for example, using processor 102 as described regarding FIG. 1, or any other suitable computing device, and/or may be used, for example, in system 400 as application profiler 410 or a portion thereof. This example assumes a 64 bit maximum data width, however other configurations are possible. It is noted that integer datatype classifier 500 may also or alternatively be implemented in software or firmware (e.g., within the Java™ virtual machine).

Integer datatype classifier 500 inputs an instruction stream 405 (and/or values of the instructions in the instruction stream 405, or other values) of application 510 as an input, and outputs information reflecting datatype per-variable of the application into an output table 520. Values of instructions may include, for example, data inputs or outputs of instructions, such as immediate values of operands of the instructions, or values stored in registers referenced by operands of the instructions. In this example, application 510 is represented by the pseudocode shown in table 3.

TABLE 3

```
a = 1;
b = 2;
f = −134;
while (...)
{
    a = a * b;
    f = f +a;
}
```

In application 510, the variable a is multiplied by the variable b with each iteration of while loop 515; and the variable f increases by the value of a with each iteration of while loop 515. Thus each iteration of the while loop includes a multiply instruction and an add instruction, and it is noted that each of these variables is an integer. Possible integer datatypes in this example are 8-bit bytes (B); 16-bit half-words (HW); 32-bit words (W); and 64-bit quad-words (QW).

For each iteration of while loop 515, the variables a, b, and f are analyzed by integer datatype classifier 500 to determine their current minimum required datatype. For example, after the first iteration of while loop 515 in application 510, the variable values are a=2, b=2, f=−132. These values are input to integer datatype classifier 500 which classifies these integer datatypes by analyzing each bit of the output, for example. It is noted that these bits may be read from any appropriate location in the processor. For example, it is noted that where the processor is a classical 5-stage reduced instruction set computing (RISC) pipeline, the bits of the output of an ALU in the execute (EX) stage may be read, or the appropriate bus of the memory access (MEM) or writeback (WB) stage, for example.

Integer datatype classifier 500 first checks the most significant bit (MSB) to determine the sign of the variable. In this example, a MSB of one indicates a negative number, although other conventions are possible. On a condition 530 that the MSB is a zero, the value of the variable is determined to be positive, and the application profiler analyzes the component words of the variable to detect if any bits are equal to one. For example, on a condition 535 that any of bits [62:31] (i.e., the next most significant bits) are equal to one, it is determined that the variable requires a QW datatype. Otherwise, on a condition 540 that any of bits [30:15] are equal to one, it is determined that the variable requires a W datatype. Otherwise, on a condition 545 that any of the bits [14:7] are equal to one, it is determined that the variable requires a HW datatype. Otherwise, it is determined that the variable requires a B datatype.

Similarly, on a condition 530 that the MSB is a one, the value of the variable is determined to be negative, and because of the way negative integers are represented in this example architecture, the application profiler analyzes the component words of the variable to detect if any bits are equal to zero. For example, on a condition 550 that any of bits [62:31] (i.e., the next most significant bits) are equal to zero, it is determined that the variable requires a QW datatype. Otherwise, on a condition 555 that any of bits [30:15] are equal to zero, it is determined that the variable requires a W datatype. Otherwise, on a condition 560 that any of the bits [14:7] are equal to zero, it is determined that the variable requires a HW datatype. Otherwise, it is determined that the variable requires a B datatype. It is noted that other classification schemes may be used in other types of architectures, such as, for example, where negative numbers are represented differently, or where negative numbers are not represented.

For each iteration of while loop 515 in application 510, the datatype of each variable is stored in output table 520. For example, in iteration 1 (where a=2, b=2, f=−132) variable a requires a B datatype (i.e., because in the binary representation of decimal 2, only bit 1 is a one); variable b requires a B datatype (i.e., because in the binary representation of decimal 2, only bit 1 is a one); and variable f requires a HW datatype (i.e., because in the binary representation of decimal −132, bit 7 contains a zero value).

As can be seen from output table 520, variable a will require increasingly larger datatypes as the iterations progress (i.e., because it is multiplied by 2 with each iteration). Variable b will only require the B datatype because it does not change in the example application 510. Variable f will require a decreasing, and then increasing datatype over time. This is because variable f begins as a negative number, to which a positive number is added at each iteration.

After application 510 has executed for a desired period of time (or a desired number of iterations), the output table 520 may be provided to a developer for use in implementing the application using appropriate datatypes. A developer may use the data in output table 520 to determine a desirable implementation of datatypes (or APIs, or hardware configurations, for example) in various ways. For example, the developer may choose to determine the most commonly used datatype over all variables for all iterations, and to implement all variables using this datatype. Or, the developer may choose to determine the most commonly used datatype over all iterations for each variable separately, and to implement each variable using its most commonly used datatype. Alternatively, the developer may choose to implement the minimum required datatype for each variable at each of several phases in the execution of application 510 (e.g., for variable a, to implement datatype B for iterations 1-$k_1$, HW for iterations $k_1$-$k_2$, W for iterations $k_2$-n, and QW for iterations beyond n). Further, the developer may choose to implement a minimum required datatype for each variable based, for example, on the smallest datatype shown in table 520 to be used for that variable, and a maximum required datatype for each variable, based, for example, on the largest datatype shown in table 520 to be used for that variable (i.e., a developer may use the data in table 520 to determine a range of possible datatypes to use for a particular variable, which may be a subset of all possible datatypes.)

It is noted that in some implementations, rather than being written to an output table 520, the datatype information output from integer datatype classifier 500 may be output to an operating system or virtual machine (VM), for example, which may adjust datatypes dynamically or automatically based on the datatype information. For example, a VM may interpret code and collect profile information including data types, data ranges, and so forth in a "warm up" phase. After the warm-up phase, the VM may generate binary code based on the interpreted code. Typically, a VM does not regenerate code after the binary code is generated. However, using the techniques discussed herein the VM may be informed by appropriate hardware, such as a profiler, that the generated binary code does not reflect a current state and may be further optimized, e.g., by dynamically regenerating a new binary code.

Figure 6:
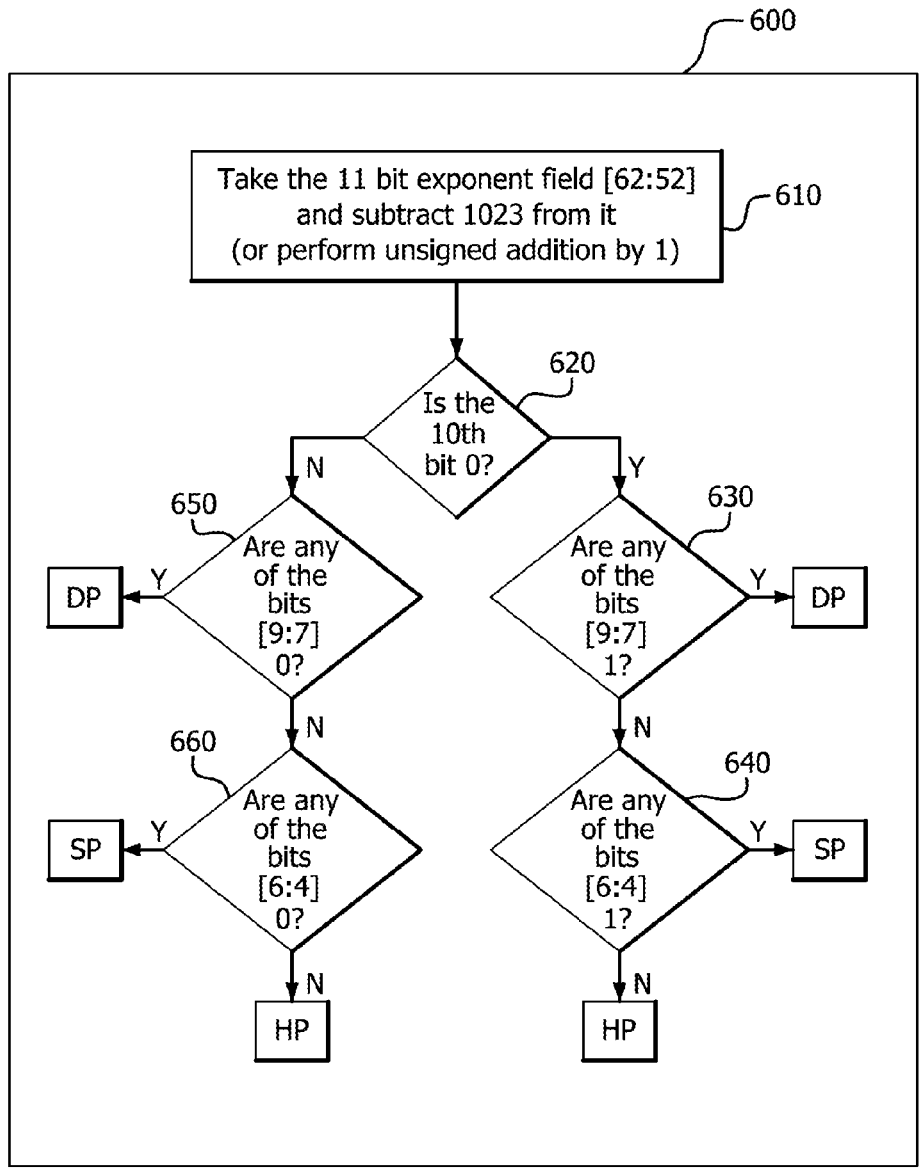
FIG. 6 is a flow chart which illustrates an example floating point datatype classifier for classifying floating point data into various datatypes.

FIG. 6 is a flow chart which illustrates an example floating point datatype classifier 600, which may be used to classify floating point data into various datatypes. In general, a floating point datatype classifier may analyze a floating point value, a subset of bits representing the value, or several subsets of bits representing the value, to determine whether the value falls within a given range which requires a datatype having a particular minimum precision. Floating point datatype classifier 600 may be used either in addition to, or in place of, the integer datatype classifier 500 as shown and described with respect to FIG. 5. Because of the way floating point numbers may be represented, a different analysis of variables may be used for floating point numbers than would be used for integers. This example assumes a 64 bit maximum data width, however other configurations are possible.

In this example, floating point numbers are represented in an IEEE 754 format with an 11 bit exponent field that stores the exponent of the number in an exponent offset bias format, where the MSB of the floating point number indicates the sign of that floating point number, and remaining 52 bits represent the fractional part, although other conventions are possible. The IEEE 754 double precision format uses an offset binary representation for the exponent; by default, it assumes the exponent has a bias of 1023 that must be subtracted from the stored exponent. In order to normalize a number represented in the IEEE 754 double precision format prior to performing operations, floating point datatype classifier 600 first subtracts 1023 from the 11 bit exponent field (i.e., bits [62:52] of the maximum data width, or, bits [10:0] of the exponent field) in step 610 because the number has an exponent bias. This mechanism is well known in the floating point community, as it means that the smallest exponent is stored as 1 (though it may represent an exponent of −1022) and the largest exponent is stored as 1111_1110b (and represents the number +1023). In the floating point community, this means that numbers with a smaller value (e.g. smaller exponent) can easily be compared simply by comparing bits using normal binary comparison circuits, as in the IEEE 754 standard. Alternately, the application profiler may perform an unsigned addition by 1 of these bits, since with a particular adder circuit design, this may be equivalent to performing a subtraction by 1023. On a condition 620 that the MSB of the 11 bit exponent field (i.e., bit [62], hereinafter referred to as bit [10] of the exponent field) is equal to zero, the value of the exponent is determined to be positive, and the application profiler analyzes other parts of the exponent field to detect if any bits are equal to one. For example, on a condition 630 that any of bits [9:7] of the exponent field (i.e., the next most significant bits) are equal to one, it is determined that the variable requires a double-precision (DP) floating point datatype, because a single-precision floating point type would not be able to hold an exponent this large. Otherwise, on a condition 640 that any of bits [6:4] are equal to one, it is determined that the variable requires a single-precision (SP) floating point datatype. Otherwise, it is determined that the variable requires a half-precision (HP) floating point datatype.

Similarly, on a condition 620 that bit [10] of the exponent field is not equal to zero, the value of the exponent is determined to be negative, and the application profiler analyzes other parts of the exponent field to detect if any bits are equal to zero. For example, on a condition 650 that any of bits [9:7] of the exponent field (i.e., the next most significant bits) are equal to zero, it is determined that the variable requires a double-precision (DP) floating point datatype, because a single-precision floating point type would not be able to hold an exponent this small (i.e., a negative number having a magnitude this large). Otherwise, on a condition 660 that any of bits [6:4] are equal to zero, it is determined that the variable requires a single-precision (SP) floating point datatype. Otherwise, it is determined that the variable requires a half-precision (HP) floating point datatype. It is noted, as with integers, that other classification schemes may be used in other types of architectures, such as, for example, where negative numbers are represented differently, or where negative numbers are not represented.

Figures 7, 8:
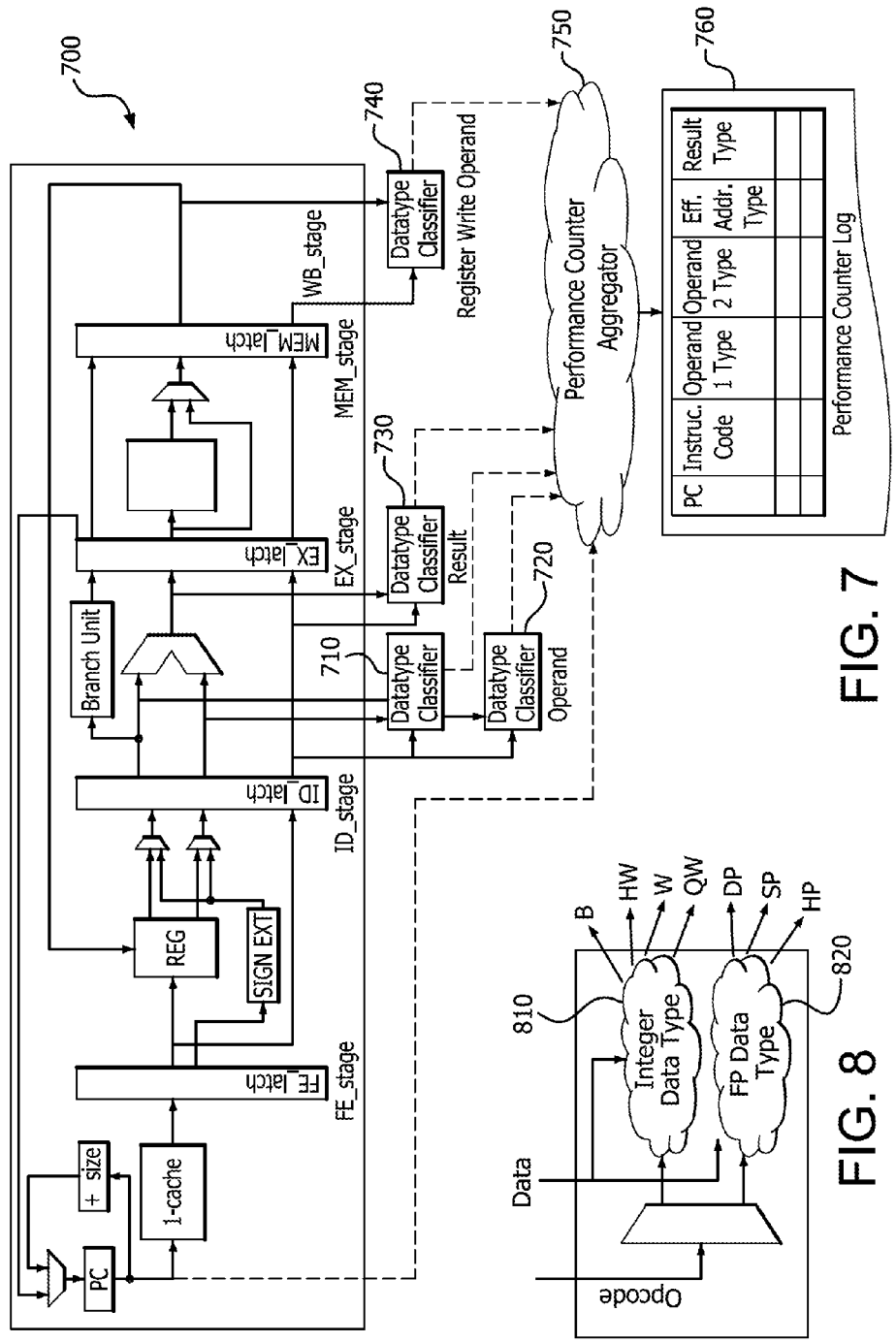
FIG. 7 is a schematic diagram illustrating an example processor architecture.
FIG. 8 is a block diagram of an example datatype classifier.

FIG. 7 is a schematic diagram illustrating an example processor architecture 700. In this example, architecture 700 is shown as a classical 5-stage RISC pipeline, including typical instruction fetch (FE), instruction decode (ID), execute (EX), memory access (MEM), and register writeback (WB) stages. For example, as shown, the FE stage includes a program counter, instruction cache, and FE latch. The ID stage includes a register file, sign extension unit, and ID latch. The EX stage includes a branch unit, arithmetic-logic unit (ALU), and EX latch. The MEM stage includes any hardware necessary for accessing memory, and a MEM latch. The WB stage includes any hardware necessary for writing results to the register file. The various components of architecture 700 are only exemplary, and there may be a greater or lesser number of, or substitutions for, various stages and components. It is also noted that the various methods, devices, and systems discussed herein, including datatype classifiers and accuracy and/or precision counters, may be implemented with any suitable computing architecture, and are not limited to architecture 700 or a RISC architecture. Architecture 700 also includes example datatype classifiers 710, 720, 730, and 740. These datatype classifiers 710, 720, 730, 740 may operate similarly to integer datatype classifier 500 and/or floating point datatype classifier 600, or in any other suitable manner for classifying variable datatypes.

Each of datatype classifiers 710, 720, 730, and 740 may be added to a different stage of architecture 700 to capture datatypes at various phases of execution. For example, in architecture 700, two arguments are passed with the instruction opcode to the EX stage. Each of these arguments, and the opcode, are input to a respective one of datatype classifier 710 and 720. For example, using the example of application 510 as shown and described with respect to FIG. 5, the instruction implemented for the multiplication operation a=a*b would result in variable a and variable b input to the ALU from the register file. These variables would also be input to datatype classifiers 710 and 720 respectively, along with the opcode for the corresponding multiplication instruction, at the points shown prior to the ALU input. Thus, classifiers 710 and 720 capture the instruction operands prior to execution of the multiplication operation, classify the required datatype for each operand, and output the classifications to performance counter aggregator 750.

Similarly, the example datatype classifier 730 is also implemented in the EX stage. Where classifiers 710 and 720 are implemented before the ALU, classifier 730 is implemented after the ALU such that it inputs the output of the ALU. Using the example of application 510 as shown and described with respect to FIG. 5, the instruction implemented for the multiplication operation a=a*b would result in variable a output from the ALU to the EX latch. This variable would also be input to datatype classifier 730 at the point shown, along with the opcode for the corresponding multiplication instruction, following the ALU output. Thus, classifier 730 captures the result of the multiplication operation output from the ALU, classifies the required datatype for the result, and outputs the classification to performance counter aggregator 750.

Example datatype classifier 740 is implemented in the WB stage. Here, datatype classifier 740 inputs opcodes and data for results for register write operands. Using the example of application 510 as shown and described with respect to FIG. 5, the instruction implemented for the multiplication operation a=a*b would result in the variable a result being written back to the register file in the WB stage. This variable would also be input to datatype classifier 740 at the point shown, along with the opcode for the corresponding multiplication instruction. Thus, classifier 740 captures the result of the multiplication operation output prior to write back to the register file, classifies the required datatype for the result, and outputs the classification to performance counter aggregator 750.

Performance counter aggregator 750 receives the output of each of the datatype classifiers 710, 720, 730, 740 and outputs the corresponding datatypes to performance counter log 760. Performance counter log 760 is indexed by program counter (PC) number, however any other suitable indexing may be used. In some implementations, the accuracy of instructions may be counted without associating any count with a PC, obviating the need for indexing. For each PC, the corresponding instruction code may be noted, along with the required datatype for each operand, result, and effective address of that instruction as executed. Performance counter aggregator 750 may operate to assemble different datatype classifications for a single instruction from datatype classifiers at different stages in the pipeline.

The datatypes recorded in performance counter log 760 may be used in various ways to attempt to improve power consumption of the processor. For example, the datatype associated with the source operands and results field for an instruction (or many instructions) may be input to a power management system in order to determine if and/or when to power gate the datapath (or a portion of the datapath) of the processor in order to save power, or to determine if and/or when to clock gate the datapath (or a portion of the datapath) to reduce design and/or runtime overhead. It is noted that such power and/or clock gating may be used to disable the datapath or a portion thereof. These datatypes may also be used, for example, to dynamically change the opcode to a narrower version of the same operation (e.g., a B datatype multiplication instruction rather than a QW datatype multiplication instruction) where feasible. This may have the advantage of adjusting datapath width for power and/or runtime economy without the need for power and/or clock gating. In another example, the datatype of the effective address may be input to a hardware power management system to power gate unused cache lines during a period of execution. It is noted that the datapath may comprise various functional units of the processor that perform data processing operations on the instructions.

FIG. 8 is a block diagram of an example datatype classifier 800. Datatype classifier 800 includes both an integer datatype classifier 810 and a floating point datatype classifier 820. Each classifier 810, 820 inputs data and an opcode from a relevant bus of a processor (e.g., architecture 700 as shown and described with respect to FIG. 7), and classifies and outputs the minimum required datatype (e.g., B, HW, W, and QW for integers; DP, SP, and HP for floating point numbers).

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for capturing an accuracy of an instruction executing on a processor, comprising:
   executing the instruction on the processor;

capturing, using a hardware counter circuit of the processor, a representation of an accuracy of a value of the instruction; and
adjusting a datatype of the instruction based on the representation;
wherein capturing the representation of the accuracy of the instruction comprises analyzing, using a datatype classifier circuit, bits of at least one value of the instruction to determine a minimum or maximum precision datatype for representing the value.

2. The method of claim 1, wherein capturing the representation of the accuracy of the instruction comprises:
determining, using the datatype classifier circuit, whether to adjust a value of the hardware counter circuit based on the determined minimum or maximum precision datatype.

3. The method of claim 2, wherein analyzing the bits of the at least one value comprises:
determining if the at least one value is within a range corresponding to a datatype; and
if the value is within the range, determining that the minimum precision datatype for representing the at least one value comprises the datatype.

4. The method of claim 1, further comprising outputting the representation to a log file, debugger, or software development tool.

5. The method of claim 1, further comprising outputting the representation to a runtime, interpreter, virtual machine, or portable code machine.

6. The method of claim 1, further comprising automatically adjusting a datatype of the instruction based on the representation.

7. The method of claim 1, further comprising outputting the representation to a power management circuit.

8. The method of claim 1, further comprising clock gating or power gating a portion of a datapath of the processor based on the representation.

9. The method of claim 1, wherein the at least one value of the instruction comprises an input value or an output value of the instruction.

10. A processor configured for capturing an accuracy of an instruction executing on the processor, the processor comprising:
a processing circuit configured to execute the instruction;
a hardware counter circuit configured to capture a representation of an accuracy of a value of the instruction;
an adjustment circuit configured to adjust a datatype of the instruction based on the representation; and
a datatype classifier circuit configured to analyze bits of at least one value of the instruction to determine a minimum or maximum precision datatype for representing the value.

11. The processor of claim 10, wherein the datatype classifier circuit is further configured to determine whether to adjust a value of the hardware counter circuit based on the determined minimum or maximum precision datatype.

12. The processor of claim 11, wherein the datatype classifier circuit is further configured to determine if the at least one value is within a range corresponding to a datatype; and if the value is within the range, determining that the minimum or maximum precision datatype for the at least one value comprises the datatype.

13. The processor of claim 10, further comprising an output circuit configured to output the representation to a log file, debugger, or software development tool.

14. The processor of claim 10, further comprising an output circuit configured to output the representation to a runtime, interpreter, virtual machine, or portable code machine.

15. The processor of claim 10, further comprising an adjustment circuit configured to automatically adjust a datatype of the instruction based on the representation.

16. The processor of claim 10, further comprising an output circuit comprised to output the representation to a power management circuit.

17. The processor of claim 10, further comprising a power management circuit configured to clock gate or power gate a portion of a datapath of the processor based on the representation.

18. The processor of claim 10, wherein the at least one value of the instruction comprises an input value or an output value of the instruction.

19. A non-transitory computer readable medium comprising instructions stored thereon which when executed by a processing device cause the processing device to:
execute an instruction;
analyze, using a datatype classifier circuit, bits of at least one value of the instruction to determine a minimum precision datatype for representing the value;
capture, using a hardware counter circuit of the processing device, a representation of an accuracy of a value of the instruction; and
adjust a datatype of the instruction based on the representation.

20. The non-transitory computer readable medium of claim 19, further comprising instructions stored thereon which when executed by a processing device cause the processing device to:
determine, using the datatype classifier circuit, whether to adjust a value of the hardware counter circuit based on the determined minimum or maximum precision datatype.

* * * * *